(12) United States Patent
Habib et al.

(10) Patent No.: US 8,117,822 B2
(45) Date of Patent: Feb. 21, 2012

(54) CARBON-FREE GAS TURBINE

(75) Inventors: Mohamed Abdel-Aziz Habib, Dhahran (SA); Amro Mohammad Al-Qutub, Dhahran (SA)

(73) Assignee: King Fahd University of Petroleum & Minerals, Dharan (SA)

( * ) Notice: Subject to any disclaimer, the term of this patent is extended or adjusted under 35 U.S.C. 154(b) by 44 days.

(21) Appl. No.: 12/662,466

(22) Filed: Apr. 19, 2010

(65) Prior Publication Data
US 2011/0131946 A1  Jun. 9, 2011

(51) Int. Cl.
F02C 3/14 (2006.01)
F02C 3/30 (2006.01)

(52) U.S. Cl. .......... 60/39.181; 60/39.5; 60/722; 60/784; 96/8; 96/10

(58) Field of Classification Search .............. 60/39.181, 60/39.5, 39.511, 39.52, 722, 784; 96/4, 8, 96/10
See application file for complete search history.

(56) References Cited

U.S. PATENT DOCUMENTS

| | | | | |
|---|---|---|---|---|
| 1,685,759 | A | * | 9/1928 | Walter ............................ 95/54 |
| 5,233,837 | A | * | 8/1993 | Callahan ........................ 62/621 |
| 5,643,354 | A | | 7/1997 | Agrawal et al. |
| 5,657,624 | A | | 8/1997 | Kang et al. |
| 5,702,999 | A | | 12/1997 | Mazanec et al. |
| 5,820,655 | A | | 10/1998 | Gottzmann et al. |
| 5,855,648 | A | | 1/1999 | Prasad et al. |
| 5,865,878 | A | | 2/1999 | Drnevich et al. |
| 5,964,922 | A | | 10/1999 | Keskar et al. |
| 5,980,840 | A | * | 11/1999 | Kleefisch et al. ................ 95/54 |
| 6,071,116 | A | | 6/2000 | Philippe et al. |
| 6,139,810 | A | | 10/2000 | Gottzmann et al. |
| 6,149,714 | A | | 11/2000 | Kobayashi |
| 6,153,163 | A | | 11/2000 | Prasad et al. |
| 6,237,339 | B1 | * | 5/2001 | Asen et al. ..................... 60/649 |
| 6,293,084 | B1 | | 9/2001 | Drnevich et al. |
| 6,298,664 | B1 | * | 10/2001 | Asen et al. ..................... 60/649 |
| 6,360,524 | B1 | | 3/2002 | Drnevich et al. |
| 6,375,913 | B1 | | 4/2002 | Alhaugh et al. |
| 6,394,043 | B1 | | 5/2002 | Bool, III et al. |
| 6,499,300 | B2 | | 12/2002 | Griffin et al. |
| 6,562,104 | B2 | | 5/2003 | Bool, III et al. |
| 6,565,632 | B1 | | 5/2003 | Van Hassel et al. |
| 6,702,570 | B2 | | 3/2004 | Shah et al. |
| 6,896,717 | B2 | * | 5/2005 | Pinnau et al. ..................... 96/10 |

(Continued)

FOREIGN PATENT DOCUMENTS

| | | |
|---|---|---|
| EP | 1484102 A2 | 12/2004 |
| WO | WO9910945 | 3/1999 |
| WO | WO03107463 | 12/2003 |

*Primary Examiner* — Ted Kim
(74) *Attorney, Agent, or Firm* — Richard C. Litman

(57) ABSTRACT

The carbon-free gas turbine is a power-producing turbine driven by the combustion of hydrocarbon fuels with oxygen. The carbon-free gas turbine includes at least one combustor for combusting gaseous fuel with oxygen. The at least one combustor includes a housing containing at least one oxygen transport reactor. The oxygen transport reactor includes an outer wall and an inner cylindrical ion transport membrane. The membrane receives pressurized air and separates gaseous oxygen therefrom, transporting the oxygen into a central region thereof for combustion with the gaseous hydrocarbon fuel, producing gaseous carbon dioxide and water vapor. A first turbine is driven by the gaseous carbon dioxide and water vapor produced by the at least one combustor and drives a first compressor. The first compressor provides the pressurized air supplied to the at least one combustor. A second turbine is driven by pressurized nitrogen gas resulting from the combustion.

5 Claims, 4 Drawing Sheets

U.S. PATENT DOCUMENTS

| | | |
|---|---|---|
| 6,921,596 B2 | 7/2005 | Kelly et al. |
| 7,125,528 B2 | 10/2006 | Besecker et al. |
| 7,160,357 B2 | 1/2007 | Gotzmann |
| 7,556,675 B2 | 7/2009 | Carolan et al. |
| 2004/0011048 A1* | 1/2004 | Linder et al. ............... 60/39.181 |
| 2005/0028529 A1 | 2/2005 | Bartlett et al. |
| 2006/0230762 A1* | 10/2006 | Hamrin ........................... 60/650 |
| 2008/0309087 A1 | 12/2008 | Evulet et al. |

* cited by examiner

CARBON-FREE GAS TURBINE

BACKGROUND OF THE INVENTION

1. Field of the Invention

The present invention relates generally to energy generation, and particularly to a carbon-free gas turbine that minimizes carbon dioxide exhaust into the environment.

2. Description of the Related Art

A turbine (sometimes also referred to as "a combustion turbine"), is an engine that extracts energy from a fluid, such as steam, hot air, combustion products, or water, and converts fluid energy into mechanical energy by impact on the blades of a rotor. When combustion gases are used, the gas turbine typically includes an upstream compressor coupled to a downstream turbine, with a combustion chamber therebetween. Energy is added to the gas stream in the combustor, where air is mixed with fuel and ignited. Combustion increases the temperature, velocity and volume of the gas flow. This is directed through a nozzle over the turbine's blades, spinning the turbine and powering the compressor.

Energy is extracted in the form of shaft power, compressed air and thrust, in any combination, and used to power aircraft, trains, ships, generators, and the like. Such conventional combustion sources of mechanical power have been adapted to a wide variety of fields. However, despite their myriad uses, gas turbines typically produce great quantities of exhaust, particularly due to their primary reliance upon the combustion of fossil fuels. It would be desirable to provide the great adaptability, and relative simplicity, of the gas turbine without the production of environmentally harmful exhaust products.

Thus, a carbon-free gas turbine solving the aforementioned problems is desired.

SUMMARY OF THE INVENTION

The carbon-free gas turbine is a power-producing turbine driven by the combustion of hydrocarbon fuels with oxygen. The carbon-free gas turbine includes at least one combustor for combusting gaseous fuel with oxygen. The at least one combustor includes a housing containing at least one oxygen transport reactor. The at least one oxygen transport reactor has an outer wall defining an open interior region therein, and an inner cylindrical ion transport membrane coaxially disposed within the open interior region. The inner cylindrical ion transport membrane is adapted for receiving the gaseous fuel within a central region thereof.

At least one fuel distributor delivers the gaseous fuel into the central region of the at least one oxygen transport reactor. Pressurized air is delivered into an annular region defined between an inner surface of the outer wall of the at least one oxygen transport reactor and an outer surface of the inner cylindrical ion transport membrane. Gaseous oxygen is separated from the pressurized air and is transported from the annular region into the central region for combustion thereof with the gaseous fuel, producing gaseous carbon dioxide and water vapor.

The at least one combustor further includes a nitrogen receiving chamber for receiving pressurized nitrogen gas separated from the pressurized air in the at least one oxygen transport reactor after the oxygen is removed therefrom. A first turbine is driven by the gaseous carbon dioxide and water vapor produced by the at least one combustor and drives a first compressor. The first compressor provides the pressurized air supplied to the at least one combustor.

A separator is further provided for receiving the gaseous carbon dioxide and water vapor from the first turbine and extracting the water therefrom. A second compressor is in fluid communication with the separator and the at least one fuel distributor for delivering the gaseous carbon dioxide from the separator to the at least one fuel distributor for recycling thereof. A second turbine is in communication with the nitrogen receiving chamber, and the second turbine is driven by the pressurized nitrogen gas. The second compressor is at least partially driven by the second turbine to deliver the recycled carbon dioxide back to the at least one combustor.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
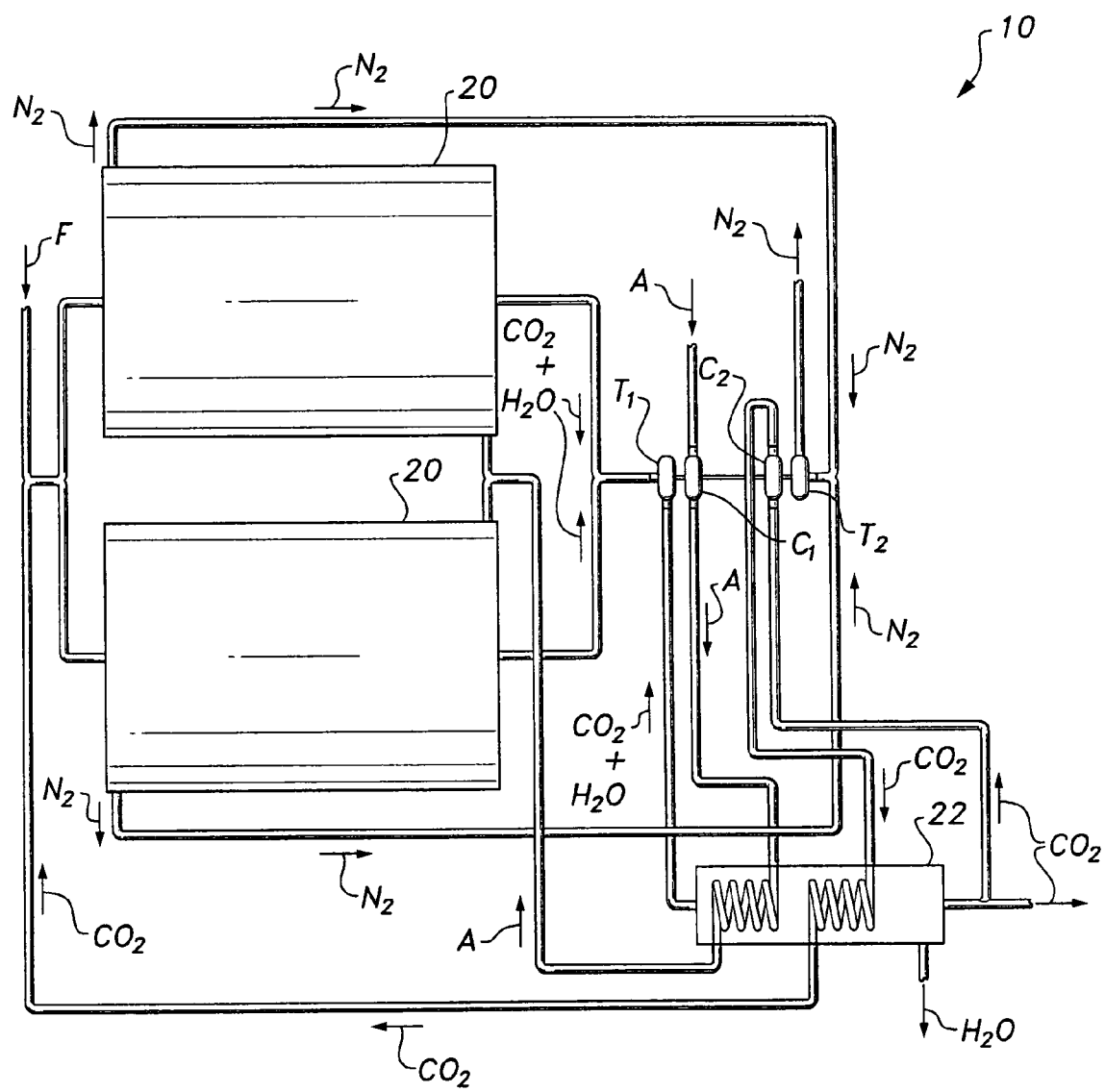
FIG. 1 is schematic diagram of a carbon-free gas turbine according to the present invention.

FIG. 1 diagrammatically illustrates the carbon-free gas turbine 10. As will be described in detail below, within at least one combustor 20, fuel F, which may be natural gas or any other type of hydrocarbon fuel combustible with oxygen, undergoes combustion with oxygen gas (denoted hereinafter as $O_2$) obtained from environmental air A, resulting in gaseous carbon dioxide (denoted hereinafter as $CO_2$) and water vapor (denoted hereinafter as $H_2O$). The heated combustion products (i.e., high temperature $CO_2$ and $H_2O$ vapor) drive a first turbine $T_1$, which, in turn, drives a first air compressor $C_1$. First air compressor $C_1$ takes in environmental air A and creates a stream of pressurized air A, which is fed into the at least one combustor 20, for combustion with fuel F.

Figure 5:
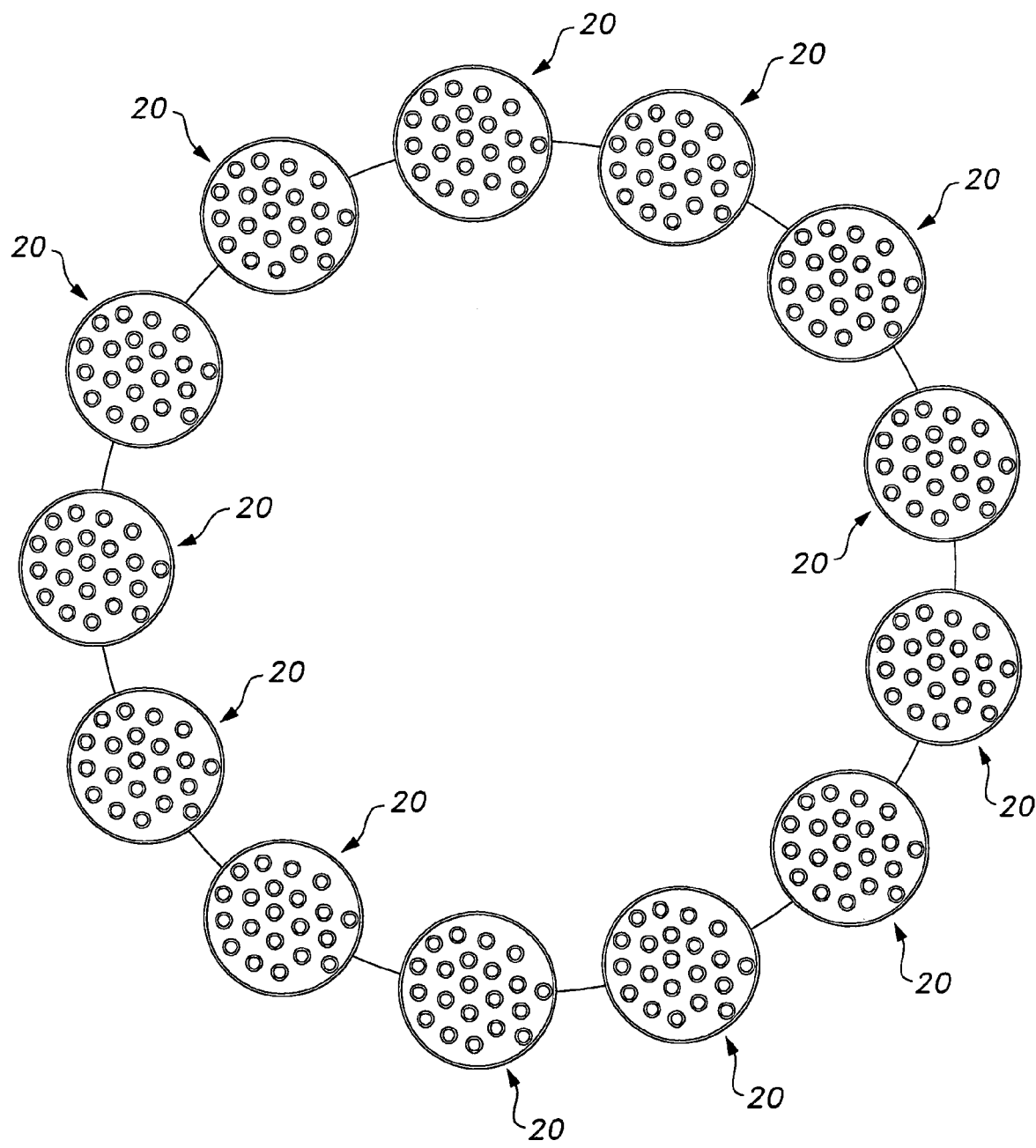
FIG. 5 diagrammatically illustrates a plurality of the combustors of FIGS. 3 and 4 linked together.

In FIG. 1, a pair of combustors 20 are illustrated. Preferably, a linked plurality, such those illustrated in FIG. 5, are provided. Combustors 20 are in fluid communication so that the combustion products (high temperature $CO_2$ and $H_2O$ vapor) from each combustor 20 flow into the first turbine T1. Similarly, the inputs of each combustor 20 are in fluid communication so that the pressurized fuel F flows evenly into each combustor.

Figure 2:
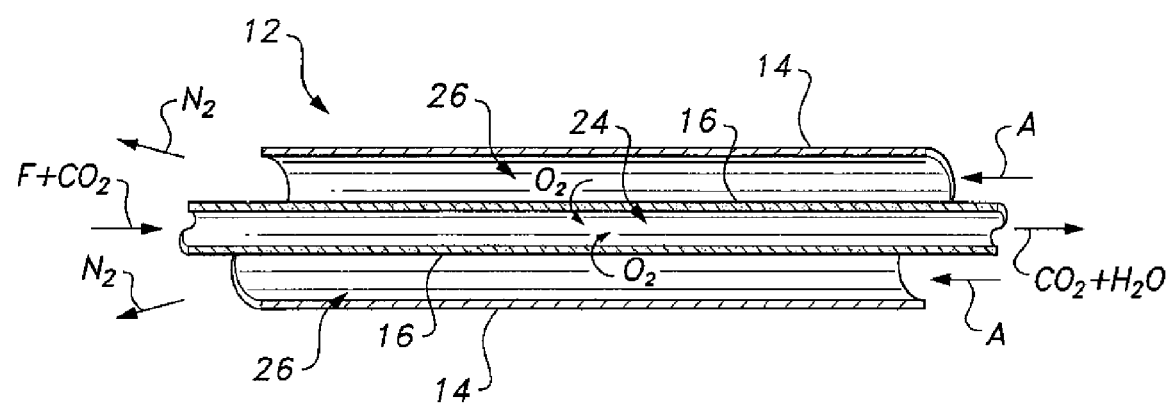
FIG. 2 is a diagrammatic side view in section of an oxygen transport reactor of a combustor of the carbon-free gas turbine according to the present invention.
Figure 3:
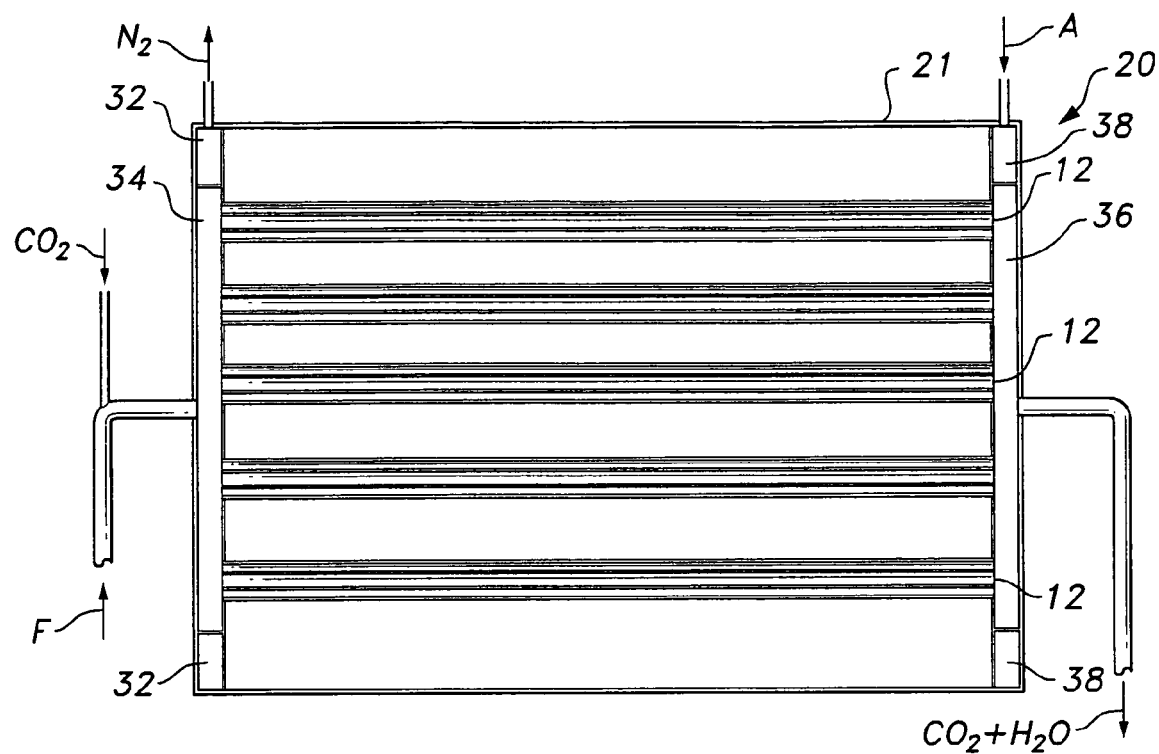
FIG. 3 is a side diagrammatic view of the combustor of the carbon-free gas turbine according to the present invention.

As shown in FIG. 3, each combustor 20 includes a plurality of oxygen transport reactors (OTRs) 12. As best shown in FIG. 2, each OTR 12 is preferably cylindrical, including an outer cylindrical wall 14 and an inner cylindrical ion transport membrane 16 positioned coaxially therein. As shown, the pressurized environmental air A (provided by compressor C1 [driven by turbine T1] and passing through separator 22) is pumped within annular regions 26 of each OTR 12, each annular region 26 being defined between the cylindrical shell of the respective inner cylindrical ion transport membrane 16 and the inner surface of the cylindrical wall 14.

Figure 4:
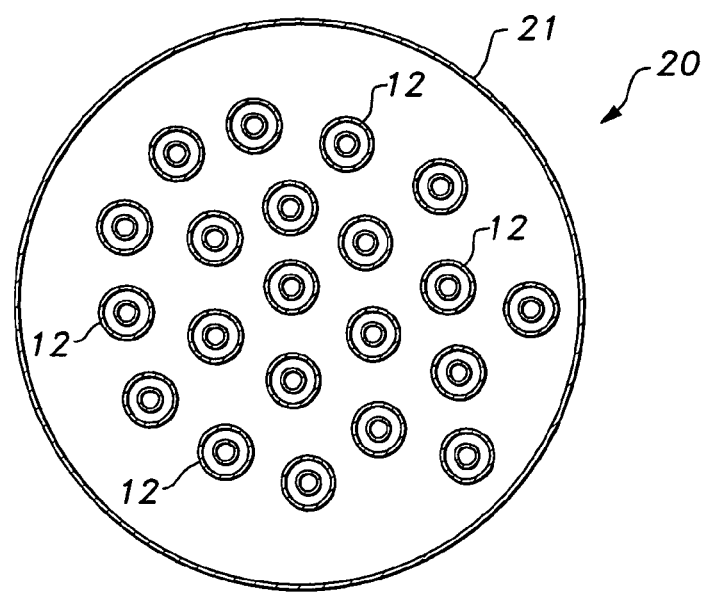
FIG. 4 is a diagrammatic transverse section view through the combustor of FIG. 3, showing the internal orientation of the oxygen transport reactors.

Gaseous hydrocarbon fuel F is pumped into a central region 24, defined by the inner cylindrical ion transport membrane 16 of each OTR 12. The inner cylindrical ion transport membrane 16 separates $O_2$ from air A, allowing only $O_2$ to pass therethrough from the annular region 26 into the central region 24. Oxygen permeable membranes are well known in the art, and any suitable type of membrane that allows only the gaseous $O_2$ to flow therethrough (and only in the inward radial direction; i.e., from annular region 26 to central region 24) may be utilized. As best shown in FIG. 4, the plurality of OTRs within each combustor 20 are preferably substantially evenly arrayed therein, positioned parallel with respect to one another, and contained within a substantially cylindrical housing 21.

The gaseous $O_2$ is transported from the annular region 26 to the inner surface of the inner cylindrical ion transport membrane 16 for combustion with fuel F within the central region 24. This combustion results in the production of gaseous $CO_2$ and $H_2O$ vapor. Combustion of the fuel F with the $O_2$ within each OTR 12 generates heat, resulting in high temperature combustion products, which are used to drive the turbine $T_1$. Further, gaseous nitrogen (denoted hereinafter as $N_2$), which remains after the $O_2$ is removed from the air A, is channeled to a reservoir 32 (of each combustor 20, as shown in FIG. 3), where it is then drawn off for driving a second turbine $T_2$, as shown in FIG. 1.

The second turbine $T_2$ drives a second compressor $C_2$. As shown in FIG. 1, the high temperature, pressurized $CO_2$ and $H_2O$ drive the first turbine $T_1$ and the exhaust passes through the separator 22, where the $H_2O$ is removed and the $CO_2$ is recycled, passing to compressor $C_2$. Any excess $CO_2$ may also be released, as shown, from separator 22, but $CO_2$ emissions are minimal. The compressor $C_2$ then passes the newly pressurized $CO_2$ back through separator 22 for injection into the combustors 20, as will be described below.

As illustrated in FIG. 3, both fuel F and air A are delivered into OTRs 12 of each combustor 20 by gas distributors 34, 38, respectively. It should be understood that any suitable type of pumping and distribution of fuel F and air A may be utilized. Air A, as described above, is provided as compressed air, compressed by first compressor C1, and delivered to the gas distributor 36 of each combustor 20. Complex gas flows may be generated within each OTR 12 by gas distributors 34, 38. For example, air A may be driven into each annular region 26 and flow in a counter-clockwise direction while the gaseous fuel F is driven to flow in a clockwise direction within the central region 24, thus ensuring a uniform temperature along the surface of the membrane 16 to enhance the stability of the combustion process.

Following their passage through the turbine $T_1$ (to drive the turbine $T_1$, which powers the compressor $C_1$, which generates the pressurized air A delivered to each combustor 20), the gaseous $CO_2$ and $H_2O$ vapor are delivered to separator 22, where the $H_2O$ is removed, and the $CO_2$ is passed to the second compressor $C_2$ for recycling thereof. The separator 22 may contain a heat exchanger or the like for extracting any remaining usable energy from the $CO_2$ and $H_2O$ before recycling. It should be understood that any suitable type of heat exchanger may be utilized, and any suitable type of pump or the like may be used to draw the gaseous $CO_2$ and $H_2O$ vapor into the separator 22. Thermal energy is extracted from the gaseous $CO_2$ and $H_2O$ vapor (converting the water vapor into liquid water), and the liquid water may then be extracted from the separator 22.

The $CO_2$ is recycled, as noted above, with the $CO_2$ being delivered to the second compressor $C_2$, for pressurizing thereof, and then passage to the gas distributor 34 of each combustor 20. The $CO_2$ is recycled to minimize carbon dioxide emission into the environment, as well as providing a purge of oxygen, ensuring a low partial pressure of $O_2$ within the central regions 24 of the OTRs 12. This allows the ratio of partial pressures of $O_2$ across the membrane 16 to remain high in order to enhance the process of separation of $O_2$ from air A, thus increasing the $O_2$ flux rate through the membrane 16.

The continuous combustion of fuel F with $O_2$ as it is transported through the membrane 16 results in a continuous low partial pressure of $O_2$ at the outer surface of membrane 16. Thus, the ratio of the partial pressure of the $O_2$ across the sides of membrane 16 remains high, ensuring a high flux rate of oxygen separation.

As noted above, the $N_2$ remaining following combustion is collected within chambers 32. Because air A is pressurized as it enters each OTR 12, the $N_2$ will have a relatively high pressure. The pressurized $N_2$ is passed to the second turbine $T_2$ and is used to drive the second turbine $T_2$, as shown in FIG. 1. The turbine $T_2$ at least partially drives the second compressor $C_2$, which drives the $CO_2$ into the distributors 34, and may also be tapped as a source of energy. The turbines $T_1$ and $T_2$ may be any suitable types of turbines, as are well known in the art, and compressors $C_1$ and $C_2$ may be any suitable types of gas compressors. It should be understood that any suitable mechanical linkages may be provided for linking the turbine $T_2$ to an external load to be driven by the energy produced thereby.

It should be noted that the fuel F combusts with pure oxygen within central regions 24, rather than mixed air A, thus resulting in increased temperatures of the exhaust gases (i.e., the $CO_2$ and water vapor produced by combustion). The heated combustion products are utilized to drive the first turbine $T_1$. Additional energy may be extracted by a heat exchanger contained within the separator 22, cooling the combustion products and allowing the water vapor to liquefy, with liquid water being drawn off.

It is to be understood that the present invention is not limited to the embodiments described above, but encompasses any and all embodiments within the scope of the following claims.

We claim:
1. A carbon-free gas turbine, comprising:
at least one combustor having a housing and at least one oxygen transport reactor contained within the housing, the at least one oxygen transport reactor having an outer wall, an inner cylindrical ion transport membrane coaxially disposed within the outer wall, an annular space disposed between the outer wall and the inner membrane, and a central region defined by the membrane;
means for delivering gaseous fuel into the central region of the at least one oxygen transport reactor;
means for delivering pressurized air into the annular space defined between the outer wall and the inner cylindrical ion transport membrane of the at least one oxygen transport reactor, the membrane being selectively permeable to oxygen so that oxygen is separated from the pressurized air and transported from the annular space into the central region for combustion with the gaseous fuel, producing heated gaseous carbon dioxide and water vapor;
a first turbine driven by the heated gaseous carbon dioxide and water vapor produced by the at least one combustor; and
a first compressor driven by the first turbine, the first compressor providing the pressurized air supplied to the at least one combustor;

a separator connected to the first turbine for receiving the gaseous carbon dioxide and water vapor from the first turbine and extracting the water from the gaseous carbon dioxide;

a second turbine;

a second compressor in fluid communication with the separator and said means for delivering gaseous fuel into the central region of the at least one oxygen transport reactor, said second compressor being driven by said second turbine to compress and pressurize the gaseous carbon dioxide output from said separator, which is delivered back through said separator for recycled input back into said at least one combustor.

2. The carbon-free gas turbine as recited in claim 1, wherein said means for delivering the gaseous fuel comprises at least one fuel distributor connected to the at least one combustor.

3. The carbon-free gas turbine as recited in claim 2, wherein the at least one combustor further comprises a nitrogen receiving chamber for receiving pressurized nitrogen gas separated from the pressurized air in said at least one oxygen transport reactor.

4. The carbon-free gas turbine as recited in claim 3, wherein said second turbine is in communication with the nitrogen receiving chamber, the second turbine being driven by the pressurized nitrogen gas.

5. The carbon-free gas turbine as recited in claim 4, wherein the at least one oxygen transport reactor comprises a plurality of oxygen transport reactors.

* * * * *